July 21, 1959 L. PAGGI 2,895,167
FILTERING LINER FOR BARRELS OF EXTRUSION MACHINES
Filed June 9, 1954
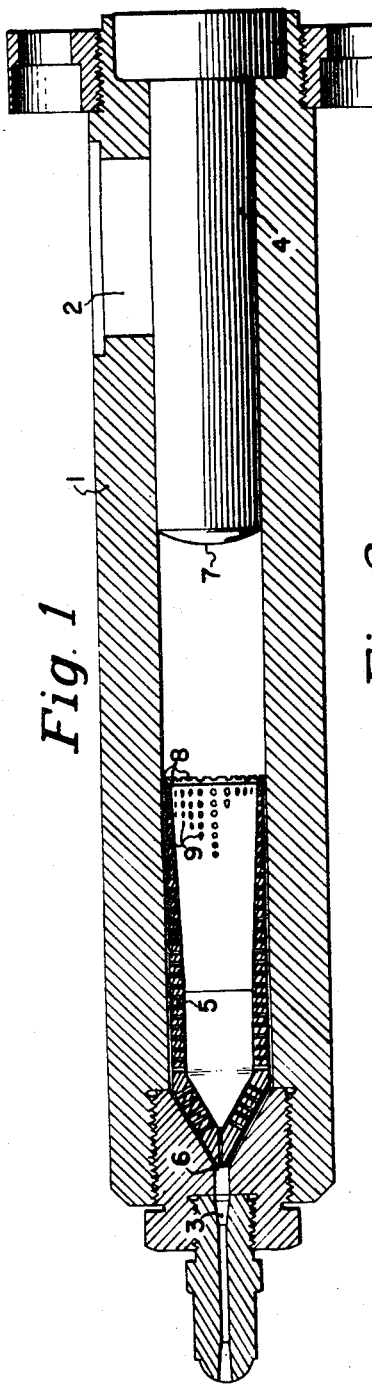
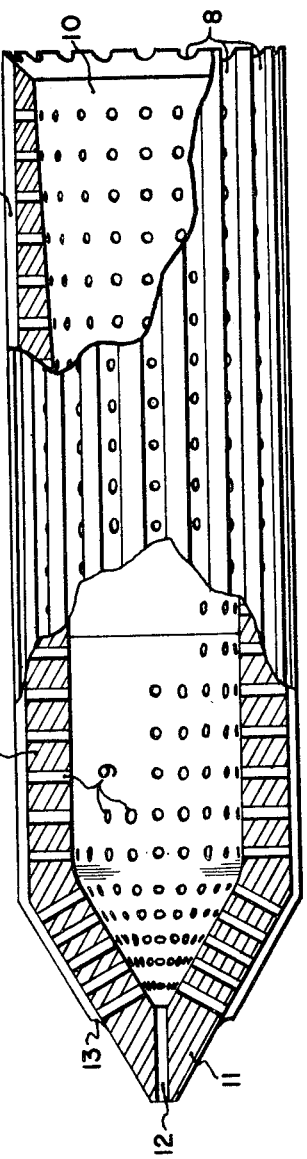
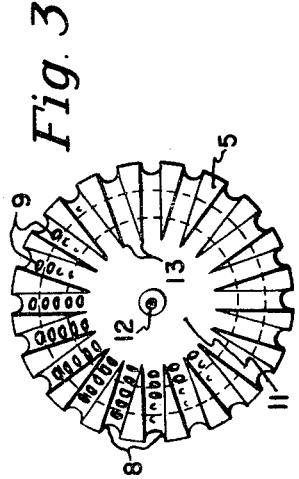
INVENTOR
LOUIS PAGGI
BY *Earl L. Tyner Jr.*
ATTORNEY

United States Patent Office 2,895,167
Patented July 21, 1959

2,895,167

FILTERING LINER FOR BARRELS OF EXTRUSION MACHINES

Louis Paggi, Belleville, N.J., assignor, by mesne assignments, to Mario Maccaferri, Rye, N.Y.

Application June 9, 1954, Serial No. 435,397

8 Claims. (Cl. 18—30)

This invention relates to an apparatus for lining a part of the inside surface of the barrel of an extrusion machine and performs the function of increasing the temperature as well as filtering large particles of plastic material being extruded, and more particularly, this invention relates to a filtering liner which may be placed in the end of an injection molding cylinder immediately preceding the die.

In extrusion devices both of the screw type and the injection molding type, it is usually necessary to supply sufficient heat to a granular plastic feed to cause the plastic to melt, following which the molded plastic must be mixed and filtered prior to being molded into a final article of manufacture. Various combinations of devices have been used in the past to perform these functions. For example, it is common to employ a torpedo mixing device just preceding the die of an extrusion machine. The torpedo device increases the resistance to plastic flow and decreases the cross section of plastic flow by partially blocking the barrel of an extrusion device. Such increased friction helps to melt the plastic material and a reduction in cross sectional area of the plastic material is advantageous in heating the flowing plastic from an external source. In addition to the torpedo mixing device, a filter is usually inserted between the torpedo mixing device and the die. This filter may be of any of a variety of devices such as a screen, a sand pack, or any other variety of filter known to those skilled in the art.

It is an object of this invention to provide a novel piece of apparatus which may be placed in the exit end of an extrusion device and which performs the dual function of filtering undesirably large lumps from the plastic flow as well as aiding in melting the plastic material by increasing friction forces and decreasing the cross sectional area of the plastic flow. It is another object of this invention to provide an easily removeable filter which may be inserted into, or removed from, the cylinder of an injection molding machine. Other objects will be apparent from the more detailed description of this invention which follows.

The above objects are accomplished in this invention by providing a hollow cylindrical liner or sleeve which is open at one end and closed at the other end and which has a plurality of longitudinal grooves on the outside surface of the liner and in each of these grooves a plurality of holes by which the inside of the liner communicates with the outside of the liner. This liner is placed in the exit end of the extrusion device between the die and the means for advancing plastic material along the barrel of the extrusion machine. The liner or sleeve is designed to fit closely to the shape and contour of the exit end of the barrel and to extend in length for at least one-third of the distance between the die and the most forward reaching point of the screw or ram which forces plastic forward along the barrel. Since the liner is not intended to touch the screw or ram device, the length of the liner must in no case be as long as the above described distance between the die and the screw or ram device.

Plastic material being advanced by the screw or ram device may be in a granular form in any stage of being melted. That is, the granules may be partially melted or completely melted prior to reaching the liner apparatus of this invention. The plastic material is forced from the peripheral surface around the mass of plastic in the interior of the hollow liner, radially outwardly through the holes by which the inside communicates with the outside of the liner, into the longitudinal grooves on the outside of the liner and thence along the grooves which converge as they reach the die at the exit of the extrusion machine. Because the holes in the liner are sufficiently small, they will prevent the passage of any lumps of plastic material and therefore act as a filter. Moreover, the plastic material, being advanced through a relatively large cross sectional flow area in the barrel, is suddenly forced to flow through such small holes that the friction of the material is increased and correspondingly the temperature of the material is increased causing the plastic material to become a homogeneous melted mass. Furthermore, if the barrel of the extrusion machine is externally heated by a steam jacket or other similar means, the liner causes the plastic to be divided into small streams, which can be heated much more efficiently than the large stream found in the main portion of the extruder barrel.

Figure 1 is a sectional view of the liner assembled in an extrusion apparatus.

Figure 2 is a sectional view of the liner apparatus of this invention.

Figure 3 is an end view of the liner apparatus of this invention.

By reference to Figure 1 it will be apparent how the liner apparatus of this invention is employed in relation to standard types of extrusion apparatus. An extrusion apparatus is formed by the combination of a barrel 1 having a feed port 2 and an exit die 3 and being in cooperating relationship with a plastic advancing device 4. The plastic advancing device 4 may be a ram as illustrated in Figure 1 or it may be a screw device. The liner or sleeve 5 which is the apparatus of this invention is placed adjacent to die 3 and closely conforms to the size and shape of the inside surface of barrel 1. The length of liner 5 in its axial direction may be at least one-third of the distance between point 6 and point 7 and less than the entire distance between point 6 and point 7. Point 6 represents the juncture between the inside surface of barrel 1 and die 3. Point 7 represents the forward end of plastic advancing device 4 when device 4 is as close to die 3 as the characteristics of the extrusion apparatus will permit. The liner 5 has a plurality of longitudinal grooves 8 disposed on the outer surface of liner 5 and grooves 8 are connected to the interior of liner 5 by a plurality of holes 9.

In the operation of an injection molding device employing the liner of this invention, granular plastic material is introduced into the molding cylinder through inlet feed port 2 while ram 4 is in its fully retracted position. Ram 4 then moves forward to the position shown in Figure 1 forcing plastic material ahead of ram 4 into the interior of liner 5. If sufficient heat has been added through barrel 1 to the plastic material being advanced by ram 4 or if sufficient friction has been developed by the action of ram 4, the plastic material in the interior of liner will be in a melted condition, including a layer of melted plastic around the peripheral surface of the mass of plastic in the liner. If this plastic material has not absorbed sufficient heat from this source the material will be incompletely melted. Plastic material then flows from the periphery of the mass of plastic in the interior of liner 5 radially outwardly through holes 9 into grooves 8 and forward through grooves 8 into die 3 under the pressure exerted by the action of ram 4. Large lumps of unmelted plastic material will be restrained from moving forward by the filtering action of holes 9. Furthermore, plastic moving through holes 9 to grooves 8 will become more completely melted due to the added friction involved in flowing through such small passage ways and possibly being heated from an external source of surrounding barrel 1.

Figure 2 is a cross sectional view taken along the axis of liner 5. The liner has an open end at 10 and a closed end at 11 with the exception of one hole 12 at the apex of liner 5 to prevent a buildup of plastic in the conical nose section of liner 5. The closed end 11 forms a restraining means holding the mass of plastic in the liner or sleeve against movements bodily as a mass in the liner. The outside surface of liner 5 contains numerous longitudinally parallel grooves 8 which extend generally from the open end 10 to the closed end 11 of liner 5. The grooves 8 communicate with the interior of liner 5 by means of holes 9. The wall thickness of liner 5 will depend upon the material of construction and is made sufficiently large to withstand internal pressure of molten plastic. The shape of the internal surface is generally cylindrical or slightly tapering to form a conical surface as shown in Figure 2. The general shape of the closed end 11 of liner 5 is shown here to be conical but this shape is governed by the internal surfaces of barrel 1 in the exit section of the barrel, which is shown as being conical in Figure 1. Various extrusion machines may have different design features at this exit section of the machine, and liner 5 is intended to conform to the shape of the exit section regardless of other considerations, since it is important that grooves 8 join in a close fitting relationship with the inside surface of barrel 1 to form small channels for directing the plastic flow to the exit of the machine at die 3. Grooves 8 are parallel and nonconverging along the cylinder portion of liner 5 but on the closed end 11 which has a generally conical shape, grooves 8 converge and therefore grooves 8 are shown as ending at point 13 where the lands, between grooves, disappear.

Figure 3 shows an end view of liner 5 as seen from the closed end 11 of the liner. Grooves 8 are shown spaced equally distant around the outer surface of liner 5. The shape of these grooves may take any generally smooth contour such as the arcuate shape shown in Figure 3. The conical shape of the closed end portion of liner 5 causes grooves 8 to converge at points 13 around this portion of liner 5. Hole 12 is also shown extending from the outer surface to the inner surface of liner 5 at the apex of the conical portion of liner 5.

Molding experiments performed with the use of the liner of this invention have been carried out on machines varying from a 1 ounce to a 16 ounce Watson-Stillman molding machine and an 8 ounce Reed Prentice molding machine fitted with nozzles for injection molding and with molds for preparing cones, test bars, rollers, and various massive castings. The filtering liners which were used in these machine were made of brass or of beryllium copper and machined to fit tightly against the inner walls of the heating cylinder of the machine. The plastic which was used was a polyamide. Comparisons were made using the same extrusion machine and in one case the filtering liner of this invention was incorporated into the machine and in the other case the filtering liner was not used in the machine. The following advantages were noted as resulting from the use of the filtering liner in the extrusion machine:

(1) The molded articles had an improved toughness.
(2) There was substantially complete elimination of voids in the massive sections of the molded articles.
(3) The operation of the extrusion machine was better in that the throughput of plastic was more uniform and there was little if any tendency for the plastic to cling to the walls of the cylinder.

In a comparison experiment for injection molding 24 rollers of nylon at one time using a 16 ounce Watson-Stillman machine, it was found that, when the filtering liner of this invention was employed in the machine, complete filling of the mold cavities was accomplished when the cylinder temperature was maintained at 540° F., and that in contrast to these results, when using the same conditions except that the filtering liner was not employed and the standard torpedo type cylinder was used, the cylinder temperature had to be elevated to 640° F. before the cavities of the mold could be filled properly. There are no particularly critical features of the design of the liner of this invention so long as a plurality of shallow, narrow grooves are disposed along the outer surface of the liner and so long as these grooves communicate with the interior of the liner by means of a plurality of small holes. The grooves may be semicircular, elliptical, rectangular or any other desired shape, although it is preferred that a curved or arcuate contour be employed so that sharp interior corners be omitted and the cleaning of this device may thereby be facilitated. The holes by which the grooves communicate with the interior of the liner of this invention need not be of any particular shape, they may be circular holes, they may be slots, or any other shape so long as they are sufficiently small to perform the action of filtering large particles from the moving plastic material.

A typical liner for an 8 ounce injection machine might be about 10 inches in overall length, and having an outside diameter of about 2⅝ inches, with a tapering inside diameter varying from about 2⅛ inches to 1⅝ inches. Twenty equally spaced grooves, semi-circular in cross section and having a radius of ³⁄₃₂ inch, are placed on the outside of the liner and in each groove 20 to 25 holes ⅛ inch in diameter are drilled in a radial direction from the groove to the interior of the liner. This design has been found to be preferable for use in well known molding machines with most of the commercial thermoplastic materials found on the market, such as polyamides, polyethylene, polyvinyl esters, polyvinyl halides, polyacrylic compounds, and others known to those skilled in the art of extrusion molding. It is obvious that this design may be expanded for larger machines, contracted for smaller machines, or otherwise varied slightly without departing from the spirit of this invention.

I claim:

1. In an extruder having a feed section, an extrusion die, a cylindrical barrel, a smoothly tapering barrel exit section joining said die to said barrel, and a means for advancing plastic along said barrel: a liner in the form of a hollow, cylindrical shell, slidably fitting within said barrel, and whose outside contour conforms closely to the inside contour of said barrel and said barrel exit section, said liner being open at the end nearest to the feed section of said extruder, a plurality of shallow grooves longitudinally disposed on the outside surface of, and over the entire length of, said liner, and in each of said grooves, a plurality of small holes communicating the outside of said liner with the inside of said liner, said liner extending in an axial direction over substantially the entire length of said barrel exit section and over a portion of said cylindrical barrel adjoining said barrel exit section for a length of at least the diameter of said cylindrical barrel, the over-all length of said liner being at least one-third the distance between the small end of said barrel exit section and the forward end of said means for advancing the plastic.

2. In an injection molding machine in combination with a cylindrical barrel, a ram for advancing plastic material along said barrel, and a die through which melted plastic material is extruded, the inside diameter of the die being substantially smaller than the inside diameter of the barrel, the die and the barrel being joined by a smoothly tapering barrel exit section: a hollow cylindrical liner in the form of an open end shell, slidably fitting within said barrel, whose outside contour conforms closely to the inside contour of said barrel and of said barrel exit section, the open end of said liner being adjacent said ram, the axial length of said liner being less than the shortest distance between the forward end of said ram and said die, and at least one-third of said distance, a plurality of longitudinal shallow grooves disposed on the outer surface of, and extending over the length of, said liner, a plurality of small holes in each of said grooves defining passageways from the interior to the exterior of said liner.

3. A plasticizing cylinder including a body structure of heat-conducting material having a main passage therein for receiving charges of plastic material in heat exchange relation with said body structure; said body structure having a plastic material intake opening into one end of said main passage and a discharge for melted plastic from the opposite end thereof; said body structure having channels therein spaced apart around and spaced from and extending along said main passage to and in communication with said discharge; and said body structure having a multiplicity of ducts therein open to and along said main passage and opening into said channels for extraction of melted plastic from along and around the outer surfaces of a charge of plastic material in said main passage and discharge of such melted plastic into said channels for flow therethrough to said melted plastic discharge.

4. In apparatus for plasticizing and extruding plastic melt, in combination, a cylinder barrel of heat conducting material having an intake at one end and a discharge at the opposite end thereof; means located at said intake end of said cylinder barrel for advancing plastic material to be plasticized into and along said barrel toward said discharge end, and a die at the discharge end of said barrel through which plastic melt is extruded, the inside diameter of said die being of substantially reduced diameter relative to the inside diameter of said cylinder barrel; a hollow liner in the form of an open shell fitting within said barrel; said hollow liner having an intake opening at one end and an outside contour conforming closely to the inside contour of said cylinder barrel with the outer surface of said liner in direct heat transfer contact with the inner surface of said cylinder barrel throughout substantially the length of said liner; said intake end of said liner being adjacent said means for advancing plastic at said intake end of said cylinder barrel; the axial length of said liner being at least equal to one-third of the shortest distance between the most advanced position of said means for advancing plastic at the intake end of said cylinder body and said die; a plurality of longitudinal grooves disposed along and spaced apart around the outer surface of said liner; and a plurality of holes in and spaced apart along each of said grooves defining passageways for extrusion of plastic melt therethrough from the interior to said grooves at the exterior of said liner.

5. A plasticizing cylinder assembly including a cylinder barrel of heat conducting material having a chamber extending axially therethrough; said cylinder barrel having an intake opening through one end thereof coaxial with said chamber and a discharge opening at the oposite end thereof also coaxial with said chamber; a sleeve member of heat conducting material fitted tightly into said chamber of said cylinder barrel in direct heat transfer contact with said cylinder barrel; said sleeve member extending through and along said chamber in said cylinder barrel throughout a major portion of the length of the latter; said sleeve member also being formed to provide therewithin a passage extending axially therethrough having an intake opening at the end thereof adjacent said intake opening of said chamber of said cylinder barrel; said passage through said sleeve member being radially and axially unobstructed thereacross throughout the length thereof for receiving and maintaining therein a solid, unbroken mass of plastic to be plasticized with the outer peripheral surfaces of such mass in direct heat transfer contact with said sleeve member; said cylinder barrel and said sleeve member having therebetween a plurality of channels spaced apart around said sleeve member and extending therealong throughout substantially the length thereof; said sleeve member having means at the end thereof opposite said intake opening for maintaining in said passage of said sleeve member a solid mass of plastic material against displacement bodily axially therein as a mass; and said sleeve member being provided with a multiplicity of openings extending radially therethrough, spaced apart therearound and throughout substantially the length of said sleeve member placing said passage through the latter in communication with said channels for extracting melted plastic from along and around the peripheral surfaces of a mass of plastic material retained in said passage and discharging such melted plastic into said channels.

6. In combination, a plasticizing cylinder assembly including a cylinder body structure of heat conducting material having a main passage extending therethrough for receiving and holding under pressure a mass of unplasticized plastic to be melted with the outer peripheral surfaces of such a mass therein in direct heat transfer contact with said heat conducting material of said body throughout substantially the length of said main passage; said cylinder body structure having an intake opening at one end of said main passage for charging thereinto unplasticized plastic to be melted and a discharge therefrom at the end thereof opposite said intake opening for receiving melted plastic from said main passage; said cylinder body structure having restraining means at the discharge end thereof for holding a mass of unplasticized plastic in said main passage against axial displacement bodily therethrough as a mass of unplasticized plastic; means for heating said cylinder body structure to melt layers of plastic along and around such a solid mass of unplasticized plastic held in said main passage; pressure means for forcing unplasticized plastic through said intake opening in to said main passage to form a mass of unplasticized plastic under pressure therein; means for extracting and removing radially outwardly at relatively closely spaced locations spaced around and spaced apart along said main passage throughout substantially the length thereof the layers of melted plastic formed along and around the peripheral surfaces of a mass of unplasticized plastic material held in said main passage by said restraining means under the pressures exerted on such mass; and means for receiving along and throughout substantially the length of said main passage, said melted plastic radially outwardly extracted from said mass of plastic in said main passage and for flowing said extracted melted plastic so received separately from said main passage to said discharge from said cylinder body structure.

7. In combination, a plasticizing cylinder assembly including a cylinder body structure of heat conducting material having a main passage extending therethrough with an intake opening at one end for charging thereinto unplasticized plastic to be melted and a discharge opening at the opposite end from said intake opening for receiving melted plastic from said main passage; said main passage of said cylinder body structure being interiorly unobstructed radially and axially throughout the length thereof; restraining means at the discharge end of said cylinder body structure for restraining and holding a transversely and longitudinally solid and unbroken mass of unplasticized plastic in said main passage against axial displacement bodily therethrough as a mass of unplasticized plastic; means for heating said cylinder body structure to melt layers of plastic along and around a solid mass fo unplasticized plastic in said main passage; pressure means for forcing unplasticized plastic through said intake opening into said main passage to form a mass of plastic material and maintain said mass under pressure in said main passage; means for extracting and removing radially outwardly at relatively closely spaced locations spaced apart around and spaced along said main passage throughout substantially the length thereof the layers of melted plastic formed along and around the peripheral surface of a solid mass of unplasticized material restrained in said main passage under the pressures exerted by said pressure means; and means for receiving along and throughout substantially the length of said main passage, said melted plastic and for flowing said extracted melted plastic separately from said main passage to said discharge from said cylinder body structure.

8. In apparatus for plasticizing plastics, in combination, holding means providing therewithin an interiorly unobstructed plasticizing chamber for holding a solid mass of unplasticized plastic material under pressure in closely compacted, granular form against movements bodily therein as a mass; said holding means providing an intake into one end of said plasticizing chamber and a discharge therefrom at the opposite end thereof; heating means for applying plasticizing heat directly to and around and along the peripheral surfaces of a mass of unplasticized plastic held in said plasticizing chamber; feeding means at said intake end of said plasticizing chamber for forcing unplasticized plastic through said intake and applying pressure to one end of the solid mass of unplasticized plastic formed and held in said plasticizing chamber; extracting means for the extraction and removal radially outwardly from locations relatively closely spaced apart around and spaced apart along a mass of unplasticized plastic under pressures exerted by said feeding means, of the layers of melted plastic formed along and around said mass by the heat directly applied thereto by said heating means; and means for flowing said extracted melted plastic from said plasticizing chamber to said discharge from the latter under the pressures exerted thereon by said feeding means.

References Cited in the file of this patent

UNITED STATES PATENTS

| | | |
|---|---|---|
| 2,573,440 | Henning | Oct. 30, 1951 |
| 2,582,260 | Kutik | Jan. 15, 1952 |

FOREIGN PATENTS

| | | |
|---|---|---|
| 676,319 | Germany | June 1, 1939 |